United States Patent Office 3,507,694

Patented Apr. 21, 1970

3,507,694

MAGNETIC RECORDING TAPE CONTAINING A POLYURETHANE BINDER FOR THE FERROMAGNETIC COMPONENT THEREOF

Wolfgang Eichler, Leverkusen, Wilhelm Abeck, Cologne-Stammheim, and Franz Hund, Krefeld-Bockum, Germany, assignors to Agfa Aktiengesellschaft, Leverkusen, Germany, a corporation of Germany No Drawing. Continuation of application Ser. No. 383,225, July 16, 1964. This application May 2, 1968, Ser. No. 727,096

Claims priority, application Germany, Feb. 14, 1964, A 45,235

Int. Cl. H01f *10/02*

U.S. Cl. 117—235 2 Claims

ABSTRACT OF THE DISCLOSURE

A magnetic recording tape comprising a substrate having a coating of ferromagnetic tellurium modified chromium dioxide dispersed in a polyurethane binder.

This application is a continuation of application Ser. No. 383,225, filed July 16, 1964 and now abandoned.

This invention relates to new and improved magnetic recording tapes comprising at least one supported magnetizable layer which contains modified ferromagnetic chromium dioxide dispersed in a polyurethane reaction resin as the binding agent.

The quality of a magnetic recording tape for the purpose of storing information in the electrical communication art is substantially determined by the properties of the magnetizable layer. The degree of distribution of the iron oxide in the magnetizable layer and, as a consequence thereof, the packing density of the iron oxide, defined as a volume filling factor (amount of the magnetic pigment per unit of volume), and the surface quality of the layer are of decisive importance in determining the value of the magnetic recording tape from the point of view of its sensitivity characteristics, noise level, and frequency response curve.

The magnetizable layer of magnetic recording tapes generally employed at the present time for the recording of sound, images and pulses consists of iron oxide and a resinous binder which is capable of adhering to the support. Plastics of high molecular weight, i.e., thermoplastic resins from various classes of chemical compounds have hitherto predominately been used for the production of the magnetizable layer either alone or in admixture with each other. Recent fields of application for magnetic recording tapes, for example, magnetic image recording, storage drums in data processing machines, magnetic machine control, endless tapes in recorded-announcement apparatus and noise recorders and the like, place considerably greater demands on the mechanical and thermal stability of the magnetizable layer than was formerly the case. Layers of most of the thermoplastic resins were not equal to these high standards, on account of their low resistance to abrasion and their relatively low softening point. On the other hand, polyurethane reaction resins prepared from polyesters containing hydroxyl groups and isocyanate (polyaddition resins) are excellently suitable for extreme stresses in the magnetizable layer on account of their great layer hardness and high elasticity, their outstanding resistance to abrasion, their good adhesion and their very high softening point (above 200° C.). The addition reaction of the resin components of low molecular weight only takes place after casting onto the non-magnetic support. The dispersing of the pigments is generally accomplished in a solution of one of the two components of low molecular weight. Dispersion of the pigment is frequently rendered very difficult in such a system.

Primarily superficial forces impede a perfect distribution of the pigment in these systems. In addition, in a mixture of iron oxide and a low molecular weight resin component of a polyaddition resin it is not possible to transmit during the grinding process any strong shear stresses which are of major importance for a good dispersion of the pigments, especially when kneader mixers or apparatuses that involve a similar principle of mixing are used for the dispersing operation.

The magnetizable layers produced from these resinous binders, which are perfect from the point of view of their mechanical and thermal properties, are frequently inferior to layers of thermoplastic resins fom the point of view of the packing of the iron oxide (density of iron oxide per unit of volume) and the surface smoothness.

Moreover, it is only insufficiently possible to align the iron oxide particles in a polyurethane resin. This, however, is necessary to obtain the required magnetic and electroacoustic properties of the recording tape. The orientation or alignment, which is used commercially, consists of exposing the tape at a stage in its preparation when the binding agent is still fluid enough to allow movement of the acicular magnetic particles under the influence of a magnetic field which aligns the particles so that their easy direction of magnetization tends to be parallel. Magnetic recording tapes prepared in this way exhibit remarkable improvements in information storage capacity as indicated by the fact that remanence measured in the direction of alignment is highly increased over that observed for unaligned tapes. The storage capacity of a magnetic recording tape can be expressed as a ratio of the saturation remanence $B_R$ to magnetic saturation induction $B_S$. For unaligned tapes this ratio is in the neighbourhood of 0.5; for oriented or aligned tapes this ratio is increased to values in the range of 0.8 to 0.9.

It is known that acicular iron oxide has similar magnetic properties as chromium dioxide. Any person having ordinary skill in the art had to expect therefore that acicular chromium dioxide dispersed in a polyurethane binding agent would show a similar behaviour as acicular particles of iron oxide ($\gamma$—$Fe_2O_3$).

It has now been found that, contrary to $\gamma$—$Fe_2O_3$, acicular ferromagnetic modified chromium dioxide can easily be dispersed and magnetically oriented in a polyurethane binding agent. The resulting magnetizable layers exhibit an outstanding surface smoothness and a volume filling factor or space factor which prior art did not consider possible. By the term volume filling factor or space factor is to be understood in this connection the volume of the magnetizable particles based on the total volume of the layer. The space factor of the layers according to the invention is between 40 and 50%.

The commercial iron oxide magnetizable layers have a space factor of about 35%; in spite of that high space factor the layers of the invention have outstanding mechanical and thermal properties. The degree of particle alignment of the tapes of the present invention is higher than that obtained with iron oxide layers. The hysteresis loop of the magnetizable layers of the invention has nearly rectangular shape.

The magnetizable layers of the invention have outstanding magnetic and acoustic properties which cannot be obtained with magnetizable particles of $\gamma$—$Fe_2O_3$. Generally the excellent properties of the magnetizable layers are based on the polyurethane as the binding agent as well as the modified chromium dioxide as the magnetizable component.

By the terms polyurethane resins and polyurethane reaction resins as used herein are to be understood reaction or condensation products of a polyester containing free hydroxyl radicals and an isocyanate. Such polyurethanes are described, for example, in British Patent No. 547,672, German Patent No. 814,225 and in the article by Otto Bayer that appeared in Modern Plastics, Vol. 24, No. 10, pages 149–152, 250, 252, 254, 256, 258, 260 and 262 (June 1947). Suitable polyesters which contain free hydroxyl radicals are obtained by reaction of polycarboxylic organic acids especially dicarboxylic acids, such as adipic and phthalic acids with polyhydric alcohols, of which at least a portion are trihydric alcohols. An excess of the alcoholic component is necessary, in order to obtain polyesters with free hydroxyl radicals. These polyesters are reacted with diisocyanates such as hexamethylene diisocyanate, tolylene diisocyanate, (toluene-2,4-diisocyanate) and or higher functional isocyanates such as triphenyl methane, triisocyanate or the reaction product of a diisocyanate with a trihydric alcohol such as glycerol, hexanetriol, trimethylol propane or mixtures of trihydric alcohols. For the purpose of the present invention the preferred amount of the polyurethane resin component is between 75 and 95%.

By the term modified ferromagetic chromium dioxide we understand in this connection acicular chromium dioxide with rutile type lattice which consists of chromium dioxide with a content of modifying additives. Such chromium dioxides are described in German Auslegeschrift 1,152,932 or in the U.S. application Ser. No. 383,206 filed July 16, 1964 now abandoned.

We have found that chromium dioxide which contain up to 15% of a telluriumoxide are particularly effective as magnetizable material for the magnetic recording tape of the invention. The preparation of that tellurium modified chromium dioxide is also described in the U.S. application referred to hereinbefore.

Preparation of a chromium dioxide modified with telluriumoxide

The method is divided into 2 steps. In the first step crystallization nuclei are produced according to the following procedure:

119 g. of $CrO_3$+4 g. of $TeO_3$+200 ml. of $H_2O$ are thoroughly mixed, introduced into a steel tube of V4A-steel and put under any oxygen pressure of 100 atmospheres in an autoclave above $H_2O$. It is heated to 280° C. in about 80 minutes, the pressure being then adjusted to 200 atmospheres and these conditions maintained for 8 hours. After cooling, the susbtance is powdered, washed free from $CrO_4^{2-}$ with distilled $H_2O$, filtered and dried in a vacuum at 40° C. Yield 99.3 g. Magnetic data: saturation remanence=296 g.g.$^{-1}$.cm. $JH_C$=267 oe.

The above nuclei are further processed as follows: 119 g. of $CrO_3$+8 g. of the above CrO-nuclei+160 ml. of $H_2O$ are thoroughly mixed, filled into a steel tube of V4A-steel and put under an oxygen pressure of 120 atmospheres in an autoclave above $H_2O$ and then heated for 80 minutes at 300° C. (pressure 270 ats.) and maintained thus for 8 hours. The reaction mixture is worked up as described above.

Example 171 g. of acicular tellurium modified chromium dioxide prepared as described above which had the following properties:

Length of the individual particle—0.7 micron
Width of the individual particle—0.1 micron
Saturation remanence—440 gauss.cm.$^3$/g.
Coercive force $IH_C$—280 oersteds are ground for 16 hours in a ball mill in a solution of 17.2 g. of a polyester which is the condensation product of 3 mol of adipic acid, 2 mol of 1.3-butylenglycol and 2 mol of hexantriol in 253 g. of ethylacetate, 70 g. of butylacetate and 21 g. of cyclohexanone.

After addition of 24 g. of hexamethylendiisocyanate which is partially reacted with hexantriol, the chromium dioxide resin dispersion is cast onto a foil of a polyester of terephthalic acid and ethylenglycol which has a thickness of 25 microns with a chromium dioxide content of 17.8 g. per m.$^2$ and a layer thickness of about 8.5 microns. The calculated space factor is about 45%. The above layer is exposed at a stage when the binder is sufficiently fluid to allow movement of the individual $CrO_2$ particles to a homogenous field having a field intensity of about 1000 oersteds. The resulting ratio $B_R/B_S$ is 0.84.

The above magnetic recording tape has outstanding electroacoustic and magnetic properties and excellent information storage capacity.

An iron oxide mangetizable layer, which contains acicular $\gamma$—$Fe_2O_3$ with the following properties:

Length of the individual particle—0.7 micron
Width of the individual particle—0.1 micron
Saturation remanence—450 gauss.cm.$^2$/g.
Coercive force—$IH_C$—ca. 300 oersteds and which was prepared identically to the chromium oxide above, has a thickness of 11 microns and an iron oxide content of 17 g. per m.$^2$ corresponding to a space factor of 32%. The ratio $B_R/B_S$ is 0.63.

What is claimed is:

1. A magnetic recording tape comprising a substrate having thereon a magnetizable layer consisting essentially of a polyurethane resin produced by the reaction of a polyester containing free hydroxy radicals with a polyisocyanate as the bonding agent, throughout which ferromagnetic particles of tellurium modified chromium dioxide containing about 0.1–15% by weight of tellurium oxide are dispersed is an amount between about 40–50% by volume based on the total volume of the magnetizable layer.

2. A magnetic recording tape as claimed in claim 1, wherein said tellurium modified chromium dioxide is produced by heating a mixture of chromium trioxide and tellurium trioxide in an aqueous medium under oxygen pressure and heating a mixture of chromium trioxide and the product of said first heating with water under oxygen pressure.

References Cited

UNITED STATES PATENTS

| | | | |
|---|---|---|---|
| 2,956,955 | 10/1960 | Arthur | 252—62.51 X |
| 3,034,988 | 5/1962 | Ingraham et al. | 252—62.51 |
| 3,074,778 | 1/1963 | Cox | 23—145 |
| 3,080,319 | 3/1963 | Arrington | 262—62.53 X |
| 3,109,749 | 11/1963 | Di Ricco | 117—72 X |
| 3,150,995 | 9/1964 | Bauer | 117—138.8 X |
| 3,216,846 | 11/1965 | Hendricx et al. | 117—62 X |
| 3,243,260 | 3/1966 | Kubota et al. | 23—145 |
| 3,247,017 | 4/1966 | Eichler et al. | 117—138.8 X |

WILLIAM D. MARTIN, Primary Examiner

B. D. PIANALTO, Assistant Examiner

U.S. Cl. X.R.

252—62.54

PO-1050
(5/69)

UNITED STATES PATENT OFFICE
CERTIFICATE OF CORRECTION

Patent No. 3,507,694 Dated April 21, 1970

Inventor(s) WOLFGANG EICHLER, WILHELM ABECK, and FRANZ HUND

It is certified that error appears in the above-identified patent and that said Letters Patent are hereby corrected as shown below:

Column 4, line 38, "is" should be --in--

SIGNED AND
SEALED
AUG 25 1970

(SEAL)
Attest:

Edward M. Fletcher, Jr.
Attesting Officer

WILLIAM E. SCHUYLER, JR.
Commissioner of Patents